Patented May 15, 1923.

1,455,495

UNITED STATES PATENT OFFICE.

AUGUST KLAGES, OF MAGDEBURG-SÜDOST, GERMANY, ASSIGNOR, BY MESNE ASSIGN-MENTS, TO THE CHEMICAL FOUNDATION, INC., A CORPORATION OF DELAWARE.

MERCURY DERIVATIVES OF AROMATIC COMPOUNDS AND PROCESS OF MANUFACTURING SAME.

No Drawing. Application filed February 4, 1915, Serial No. 6,052. Renewed December 9, 1919. Serial No. 343,641.

*To all whom it may concern:*

Be it known that I, AUGUST KLAGES, a subject of the German Emperor, and resident of Magdeburg-Südost, in the Kingdom of Prussia, German Empire (and whose post-office address is c/o Saccharin-Fabrik, Aktiengesellschaft, vorm. Fahlberg, List & Co., same place), have invented new and useful Improvements in Mercury Derivatives of Aromatic Compounds and Processes of Manufacturing Same, of which the following is a full, clear, and exact specification.

This invention relates to mercury derivatives of aromatic compounds having the general formula

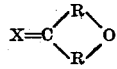

in which X represents one of the radicals

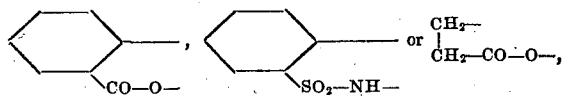

while R represents a phenyl group in which one or more of the hydrogen atoms may be replaced by halogen and to a process of manufacturing said mercury derivatives. These products can on one hand be used as colouring matters, on the other hand they are suitable for medicinal purposes in view of the mercury contained therein, especially for use as antiluetics.

A process for the production of fluorescein salts containing mercury is already known. According to this process fluoresceins which belong to the class of compounds above referred to are treated with mercuric salts in the presence of alkalis and the corresponding alkali salts are obtained by evaporating the solution. If it is tried to separate the free fluorescein mercury derivatives from the products obtained in this process by precipitating them with hydrochloric acid in the cold it is excessively difficult to filter off the precipitates and in view of their colloidal condition it is very difficult to free them from adhering or absorbed mercury salts. When precipitating with hydrochloric acid while heating products are obtained which contain mercuric chlorid, as a portion of the mercury is split off from the complex. The complex mercury compounds are also unstable in sodium carbonate solution and they slowly split off mercury in the form of a grey precipitate even at ordinary temperature. Further the complex mercury compounds obtained by this known process are not pure, but contain other products in which the mercury is less firmly bound and which therefore yield precipitates with ammonium sulfid solution even in the cold. It is true that by extracting the products with alcohol or acetone it is possible to remove the adhering mercury and the excess of fluorescein, however, the products when applied to animals show irregularities of action and it must be concluded therefrom that they are not homogeneous and pure. Probably they contain, besides the complex mercury derivatives, so called semi-complex derivatives which are formed as intermediate products and in which the mercury is introduced into the hydroxyl-group, such products being very poisonous because of their instability.

While these disadvantages are not very material if the products are used as colouring matters, it is evident that they make it impossible to use the compounds for medicinal purposes.

According to this invention all these drawbacks are avoided.

It has been found that by preparing a mercury derivative in an absolutely neutral solution it is possible to obtain homogeneous pure products in a form allowing of easy separation.

This is accomplished by heating the aromatic compounds above referred to (phthaleins, sacchareins or succineins) with a large excess of a mercuric salt, especially mercuric chlorid. If some mercuric oxide is separated it is re-dissolved in the excess of mercuric salt solution and can be removed by merely washing with water without any addition of acid. Products containing two atoms of mercury are thus obtained in the form of fine granular precipitates, which can be easily and rapidly filtered off. By repeated washing with hot water the products are freed from mercuric chlorid and they are very stable with respect to ammoniums sulfid even under the influence of heat. For removing adhering fluorescein or other similar starting material the products are extracted with alcohol or acetone.

The new process has the further advantage that it renders possible the manufacture of derivatives which cannot be prepared by the known process. Indeed, while mercury can be introduced into fluoresceins and their chlorine derivatives according to the known process above referred to this does not apply to bromine and iodine derivatives. For instances in the case of tetra-bromfluorescein there is no or at least nearly no reaction even if it is boiled several hours with mercuric chlorid and sodium carbonate solution. On the contrary according to the present process mercury can be very easily introduced even into these products.

Examples.

1. *Fluorescein derivative.*—16.6 grams of fluorescein (1/20 gram molecule) are dissolved in 200 cubic centimeters of water with 5.3 grams of dried sodium carbonate (1/20 gram molecule) while boiling. The solution is then slowly poured into a boiling solution of 81 grams of mercuric chloride (3/10 gram molecule) in ¼ litre of water and boiled during one hour. An orange precipitate is immediately formed and then filtered while hot. The precipitate may be readily filtered and washed. After pressing the precipitate is again suspended in ½ litre of water, heated to boiling, again filtered and washed until the wash water does not show any turbidity or dark coloration on addition of ammonium sulfid solution. The precipitate is then dried at about 80°. The yield is about 40 grams and is approximately quantitative. For removing the last traces of mercuric chloride the product is extracted with acetone during 2 hours until the solvent drips off without any coloration and is then further extracted during 2½ hours with ethyl alcohol.

The product is insoluble or sparingly soluble in benzin, acetone, ether, chloroform, acetic ether, glacial acetic acid and benzene. Sodium carbonate solution, caustic soda and ammonia solution dissolve it with a dark red colour, the diluted solution showing a strong yellowish green fluorescence. From these solutions the compound is precipitated by hydrochloric acid in the form of a yellowish precipitate the colour of which is again changed into reddish-yellow by washing with hot water. On addition of ammonium sulfid solution to a solution of the compound in ammonia solution no precipitate is formed while cold, only on heating a black coloration is obtained. The compound produces intensely yellow shades on silk and mordanted cotton.

2. *Methylfluorescein derivative.*—4/100 gram molecule of resorcinphthalein (14.4 grams) prepared according to Fischer, Annalen der Chemie, volume 183, page 63 (see also Meyer, Berichte der Deutschen Chemischen Gesellschaft, volume 28, page 2959) by heating three parts by weight of phthalic anhydride, 5 parts of resorcin and 5 parts of concentrated sulfuric acid to from 140 to 150°, are dissolved in the theoretical quantity of caustic soda (80 cubic centimeters of normal caustic soda, the hot solution is then slowly poured into a boiling solution of 110 grams of mercury chlorid (5 times the theoretical quantity) in 400 cubic centimeters of water and boiling continued for 20 minutes. The mercury compound separates immediately and is filtered as in Example 1, well washed, again suspended in ½ litre of hot water, heated to boiling, filtered, thoroughly washed until no mercuric chloride can be detected in the filtrate, well pressed, and dried at a gentle heat. The yield is 30 grams. The precipitate is then extracted with alcohol during two hours.

The mercury derivative is a clear brown powder of a color somewhat darker than that of the product containing no mercury. It is soluble in sodium carbonate and alkali solution with a red colour; on dilution a strong fluorescence is produced. The solution in ammonia liquor is not so intensely coloured and the fluorescence is stronger.

In the ammoniacal solution ammonium sulfid causes a separation of mercury only on heating. The product is sparingly soluble or insoluble in the usual organic solvents.

On silk intensely yellow shades are obtained.

3. *Dibromfluorescein derivative.*—Dibromfluorescein is obtained by adding the theoretical quantity of bromine to an alcoholic solution of fluorescein cooled with ice. The melting point of the dibromfluorescein is 261–262°.

19.6 grams of dibromfluorescein (4/100 gram molecule) are dissolved in 80 cubic centimeters of normal caustic soda and 100 cubic centimeters of water. The hot solution is then added to a boiling solution of 80 grams of mercuric chloride in ¼ litre of water and boiled for several minutes. A clear red precipitate is immediately formed, which precipitate easily separates and can readily be filtered and washed. If the wash-water no longer contains mercury chloride the precipitate is dried. The yield is 26 grams. The product is then extracted with alcohol and acetone during 4½ hours.

The product forms a brilliant red powder soluble with a red coloration in sodium carbonate or caustic alkali solutions, on dilution as well as in ammoniacal solution a green fluorescence is obtained. On addition of ammonium sulfid solution to the ammoniacal solution mercuric sulfid is precipitated only on heating. The product is nearly insoluble in the usual organic solvents except glacial acetic acid, in which the compound is appreciably soluble. On silk rose shades are obtained.

4. *Tetrabromfluorescein derivative.*—19.4 grams of eosin (3/100 gram molecule) are dissolved in 60 cubic centimeters of normal caustic potash and slowly dropped into a boiling solution of 81 grams of mercuric chloride in 200 cubic centimeters of water. Boiling is continued for 45 minutes. The product is then filtered, thoroughly washed and dried. The yield is 23 grams. The product is then extracted during 2 hours with alcohol and then during 2 hours with acetone.

The product forming a red powder somewhat darker than eosin is soluble with a red coloration in sodium carbonate and caustic alkali solutions, on dilution the solutions show a weak fluorescence. By addition of hydrochloric acid a more distinctly coloured product is precipitated. By addition of ammonium sulfid solution the product is more easily decomposed than the corresponding fluorescein derivative containing no bromine.

The product is sparingly soluble or insoluble in the usual organic solvents except glacial acetic acid in which it is appreciably soluble.

5. *Tetraiodfluorescein derivative.*—18 grams of commercial erythrosin (2/100 gram molecule of tetraiodfluorescein potassium salt) are dissolved in 125 cubic centimeters of water and slowly poured into a boiling solution of 64 grams of mercury chlorid in 200 cubic centimeters of water. Boiling is then continued for 15 minutes. The red precipitate obtained can easily be filtered. For removing adhering mercuric chloride it is, after pressing, again suspended in ½ to ⅔ litres of water and then heated to boiling. It is then filtered, washed and dried. The yield is 12.5 grams. The product is then extracted with alcohol during some hours.

The mercury derivative forms a red powder of the same coloration as the starting material. It is soluble in caustic alkali solutions with a dark red coloration. On dilution and on solution in ammonia fluorescence is produced. On boiling with ammonium sulfid solution a black coloration is slowly produced.

The product is sparingly soluble or insoluble in the usual organic solvents. By means of glacial acetic acid it is rather easily dissolved. On silk rose shades are obtained.

6. *Phenolphthalein derivative.*—19 grams of phenolphthalein (6/100 gram molecule) are dissolved with 12.8 grams of sodium carbonate and 300 cubic centimeters of water and poured into a boiling solution of 108 grams of mercury chlorid. The colour of the precipitate is at first nearly white and then turns to a clear brown with a violet shade. The precipitate is boiled during 15 minutes, then filtered and thoroughly washed until the filtrate is free from mercuric chloride. The weight of the dry product is 32 grams. After two hours' extraction with acetone a powder is obtained having a weakly rose-violet coloration.

In caustic alkali and ammonia solutions the product is soluble with a dark violet coloration. It is somewhat soluble in ethyl and methyl alcohol, acetone and ether, very easily soluble in glacial acetic acid from which it can be separated in the form of white flakes. Ammonium sulfid solution causes a separation of mercuric sulfid only on boiling.

On silk violet shades are obtained. On washing with diluted hydrochloric acid this coloration is removed, while it is reproduced by treatment with sodium carbonate solution.

7. *Tetraiodphenolphthalein derivative.*—16.4 grams of tetraiodphenolphthalein (2/100 gram molecule) are dissolved in 44 grams of sodium carbonate and 400 cubic centimeters of water and added to a boiling solution of 40 grams of mercury chlorid. Boiling is then continued during ½ hour. A brown precipitate is obtained which is filtered, thoroughly washed and dried. The yield is 14 grams.

The brown powder is soluble in caustic alkali solution with a blue coloration having a violet shade. It is insoluble in alcohol, ether and acetone, appreciably soluble in glacial acetic acid. It is stable against ammonium sulfid solution in the cold. The product produces clear blue shades on silk.

8. *Hydroquinonephthalein derivative.*—Hydroquinonephthalein is obtained by heating 37 grams of phthalic anhydride, 55 grams of hydroquinone and 200 grams of stannic cholrid during 15 hours (see Berichte der Deutschen Chemischen Gesellschaft, volume 11, page 713, volume 28, page 2959, Beilstein, Handbuch der organischen Chemie, third edition, volume II, page 2065).

19.8 grams of hydroquinonephthalein (6/100 gram molecule) are dissolved in 120 cubic centimeters of normal caustic soda and 180 cubic centimeters of water. The solution is added to a boiling solution of 150 grams of mercury chlorid in 500 cubic centimeters of water and boiling continued for 10 to 20 minutes. The main quantity of the mercury compound is precipitated in the form of a brown powder, while a certain quantity is separated in the form of a viscous mass which however is probably chemically identical with the brown powder. The product is filtered, thoroughly washed and dried. The yield is 36 grams.

9. *Oxyhydroquinonephthalein derivative.*—14.6 grams of oxyhydroquinonephthalein (4/10 gram molecule) (Berichte der Deutschen Chemischen Gesellschaft, volume 34, pages 2299, 2617, 2637) are dissolved in 80 cubic centimeters of normal caustic potash and added to a boiling solution of 100 grams of mercuric chloride. Boiling is continued during 10 minutes. The produced black precipitate is filtered off and thoroughly washed. The yield is 33 grams.

The substance is soluble in caustic alkali solutions with a reddish-violet coloration. On addition of ammonium sulfid solution mercury in the form of sulfid separates only on boiling. On silk the compound produces reddish-violet shades which are removed by treatment with hydrochloric acid and reproduced by addition of sodium carbonate.

10. *Resorcinsuccinein derivative.*— 17 grams of resorcinsuccinein (6/100 gram molecule) obtained by heating one gram molecule of succinic acid anhydride with 2 gram molecules of resorcin in the presence of zinc chlorid during 6 hours, are dissolved in 120 cubic centimeters of normal caustic soda by heating and slowly added to a boiling solution of 200 grams of mercuric chloride. Boiling is continued for 15 minutes and the dark rusty brown precipitate which is immediately formed, is filtered and thoroughly washed. It is then well pressed, again suspended in water, heated to boiling, filtered, washed and dried. The yield is 45 grams.

The product is easily soluble in sodium carbonate, caustic alkali and ammonia solution with a reddish-brown coloration and green fluorescence. The ammoniacal solution yields on addition of ammonium sulfid a black precipitate only on continued heating or boiling. On silk rose shades are obtained.

11. *Cresorcinsuccinein derivative.*—Cresorcinsuccinein is obtained by heating 1 molecular proportion of succinic anhydride with 2 molecular proportions of cresorcin in the presence of zinc chlorid to 160° to 205° C.

22 grams of cresorcinsuccinein (7/100 gram molecule) are dissolved in a slight excess of diluted caustic soda (corresponding to about 160 cubic centimeters of normal caustic soda) and slowly poured into a boiling concentrated solution of about 200 grams of mercury chlorid. Boiling is continued for 15 minutes. The brown precipitate is filtered, washed, suspended in water, again heated to boiling, filtered, thoroughly washed, pressed and dried. The yield is 50 grams.

The brown compound is soluble in sodium carbonate and caustic alkali solution with a reddish brown coloration. On boiling with ammonium sulfid solution a black coloration is obtained. On silk salmon red shades are obtained.

12. *Resorcinsaccharein derivative.*—Resorcinsaccharein is prepared according to the specification of German Patent No. 100,779.

18.35 grams of resorcinsaccharein (5/100 gram molecule) are dissolved in 100 cubic centimeters of normal caustic soda and poured while hot into a boiling concentrated solution of 150 grams of mercury chlorid. After 15 minutes' boiling the brown precipitate is filtered off, thoroughly washed and dried. The yield is 35 grams. The product is then extracted with alcohol. The brown powder is sparingly soluble in sodium carbonate and ammonia solution, more easily soluble in caustic alkali. It is insoluble in ligroin, alcohol, acetone and benzene and is decomposed by ammonium sulfid solution only on heating.

What I claim is:

1. The hereindescribed process of preparing mercury derivatives of phthaleins, which consists in boiling neutral solutions of alkali salts thereof with a large excess of a mercuric salt solution.

2. The hereindescribed process of preparing a fluorescein mercuric derivative, which consists in boiling a neutral solution of a fluorescein alkali salt with an excess of a mercuric salt solution.

3. The hereindescribed process of preparing a fluorescein mercuric derivative, which consists in boiling a neutral solution of a fluorescein alkali salt with an excess of a mercuric chlorid solution.

4. The process of preparing a fluorescein mercuric derivative which comprises dissolving a fluorescein derivative in an alkali, adding a neutral solution of the same to a boiling solution of mercury chloride and boiling for about one hour.

5. The process of preparing a fluorescein mercuric derivative which comprises dissolving a halogenated fluorescein compound in an alkali, adding a neutral solution of the same to a boiling solution of mercury chloride and boiling for about one hour.

6. The process of preparing a fluorescein mercuric derivative which comprises dissolving tetrabrom fluorescein in an alkali, adding a neutral solution of the same to a boiling solution of mercury chloride and boiling for about one hour.

7. The process of preparing a fluorescein mercuric derivative which comprises dissolving tetrabrom fluorescein in an alkali, adding a neutral solution of the same to a boiling solution of mercury chloride and boiling for about one hour, and then filtering, washing, drying, extracting with alcohol and finally extracting with acetone.

8. As a new article of manufacture, a tetrabrom fluorescein mercuric derivative, insoluble or only slightly soluble in the usual organic solvents, excepting glacial acetic acid in which it is sparingly soluble, soluble in solutions of sodium carbonate and caustic alkalis forming a solution having a red color.

In testimony that I claim the foregoing as my invention, I have signed my name in presence of two subscribing witnesses.

AUGUST KLAGES.

Witnesses:
   OTTO HÖDING,
   L. OEHLMANN.